United States Patent [19]

Nakagawa et al.

[11] Patent Number: 4,575,304
[45] Date of Patent: Mar. 11, 1986

[54] ROBOT SYSTEM FOR RECOGNIZING THREE DIMENSIONAL SHAPES

[75] Inventors: Yasuo Nakagawa, Chigasaki; Takanori Ninomiya, Yokohama, both of Japan

[73] Assignee: Hitachi, Ltd., Tokyo, Japan

[21] Appl. No.: 482,730

[22] Filed: Apr. 7, 1983

[30] Foreign Application Priority Data

Apr. 7, 1982 [JP] Japan .................................. 57-56584

[51] Int. Cl.[4] .............................................. B66C 1/00
[52] U.S. Cl. ...................................... 414/730; 901/47
[58] Field of Search ........................... 901/47; 414/730

[56] References Cited

U.S. PATENT DOCUMENTS

| | | | |
|---|---|---|---|
| 3,834,819 | 9/1974 | Montone | 901/47 |
| 4,017,721 | 4/1977 | Michaud | 901/47 X |
| 4,343,553 | 8/1982 | Nakagawa et al. | 356/376 |
| 4,380,696 | 4/1983 | Masaki | 901/47 X |

Primary Examiner—Robert J. Spar
Assistant Examiner—Dennis Williamson
Attorney, Agent, or Firm—Beall Law Offices

[57] ABSTRACT

The present invention consists in a robot wherein a slit-light detector which is constructed of a light projector for projecting light so as to form a slit-light on an object to-be-handled and an image detector for detecting an image of the light-section waveform, is mounted on an operating member of the robot; means for scanning the slit-light detector is disposed; and the slit-light detector detects range data, on the basis of which a position, posture, inclination etc. of the object in a three-dimensional shape are detected, so that the robot can handle the object.

18 Claims, 17 Drawing Figures

ROBOT SYSTEM FOR RECOGNIZING THREE DIMENSIONAL SHAPES

BACKGROUND OF THE INVENTION

The present invention relates to a robot which can recognize the presence, position and posture of an object to be handled by the robot and spacial circumstances within operating limits, this information being required for executing various operations such as assembly, inspection and adjustments by the use of the robot.

As exemplified in FIG. 1, robot vision for recognizing the position and posture of an object detects an image by installing an image detector 3 over a work table 1 and illuminating this work table from near the same by means of an illuminator 4. Upon the recognition of the position and posture of the object, a robot arm 2 operates in accordance with the information. This method can recognize the position and posture of the object on the plane of the table, but it cannot recognize the three-dimensional shape of the object. For example, regarding articles piled on the table, each article cannot be approached by inclining the robot arm in accordance with the inclination information thereof so as to agree with the grip surface thereof. Moreover, unless there is a clear contrast (difference in density) between the object and the work table, the position and posture on the plane of the table cannot be determined.

On the other hand, a system has been known in which a visual device is attached to the fore end of the arm of a robot so as to perform feedback. FIG. 2 shows an example of the system, wherein a weld line 5 along which a welding operation is conducted and a welding head 7 is tracked. A slit light projector 6 is mounted on the fore end of a robot arm 2, and projects slit light 8 on the weld line 5. An image detector 3 attached to the foremost end of the robot arm detects the image of the weld line and evaluates the position thereof, whereupon the robot arm is controlled so that the deviation of the weld line from a desired value may become zero. This system, however, detects the positions of the weld line and feeds them back at respective detection timings and cannot recognize the three-dimensional position and posture of the object.

SUMMARY OF THE INVENTION

An object of the present invention is to eliminate the disadvantages of the prior arts described above, and to provide a robot which can recognize the three-dimensional shape of an object with a coordinate system of the robot and then perform an operation irrespective of the posture and shape of the object to be handled.

The present invention is characterized in that a slit light projection and detection head, which consists of a projector for projecting light so as to form a light segment on an object to-be-handled and an image detector for detecting the image of the light segment, is mounted on the operating member (such as the arm member and the wrist) of a robot, while means for causing the light segmentation and detection head to scan is disposed, and that the light segmentation and detection head is used for detecting a range data, on the basis of which variables such as, for example, the position, posture, and inclination of the object in a three-dimensional shape is detected, whereby the robot is permitted to perform operations such as gripping.

That is, since the robot can assume various positions and postures, the installation of the light segmentation and detection head on this robot makes it possible to detect the three-dimensional shape of the object irrespective of the posture and shape in which this object is put.

Moreover, since the present invention furnishes the light segmentation and detection head with the device for the scanning of the image detector, it can detect the three-dimensional shape of the object in the state in which the robot is held in a predetermined posture and position, so that the three-dimensional shape of the object can be detected accurately and fast.

Besides, it is considered that a plurality of objects exist in positions of substantially equal distances. According to the present invention, therefore, the range data is differentiated to obtain an edge picture, a closed region surrounded chiefly with jump edges is segmented, and the desired object is separated and extracted using the area and the height of the center of gravity of each segmented closed region as a criterion. Regarding the separated object, variables such as, for example, the position, posture, and inclination etc. are detected on the basis of the range data likewise to the foregoing, so that the robot can perform the operation of, e.g., gripping this object.

DETAILED DESCRIPTION OF THE PREFERRED EMBODIMENTS

Figure 1:
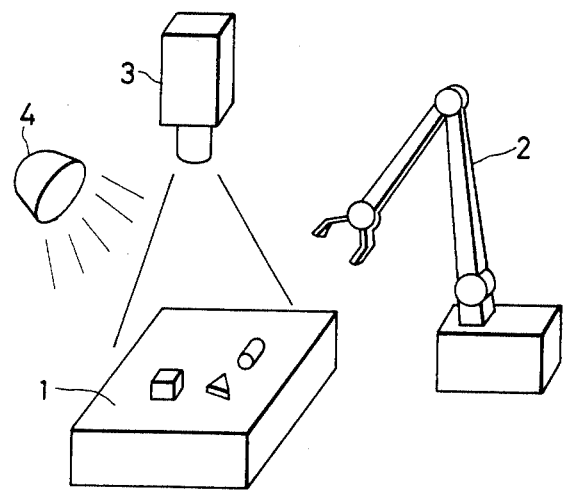
FIG. 1 is a view for explaining a robot control based on conventional plane picture detection.
Figure 2:
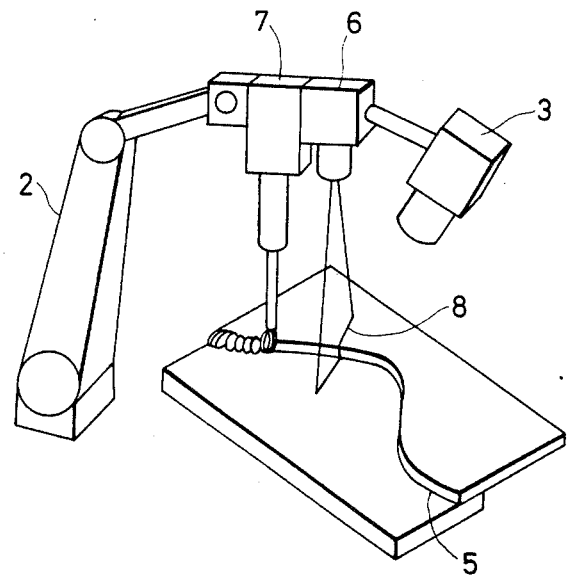
FIG. 2 is a view for explaining a tracking operation based on a conventional structured light detector.

Now, an embodiment of the present invention will be described with reference to FIG. 3. Numeral 15 designates an industrial robot which is, for example, an articulated robot having five degrees of freedom. The industrial robot 15 is constructed of a turret 15a which turns about a vertical axis relative to a base 14, an upper arm 15b which rotates about a horizontal shaft 16a, a forearm 15c which rotates about a horizontal shaft 16b ahead of the upper arm, and a wrist 15d which rotates about a horizontal shaft 16c ahead of the forearm and which further rotates about an axis perpendicular to the horizontal shaft 16c. The wrist 15d is furnished with a hand 17 to which a finger (chuck) 18 is attached. The hand 17 is provided with a three-dimensional shape detector 11. The three-dimensional shape detector 11 is constructed of a slit light detector 12, a rectilinear movement mechanism 9 which scans the slit light detector 12 in the direction of a y-axis, a motor 10 which drives the rectilinear movement mechanism 9, and a displacement detector 13, such as rotary encoder, by which the scanning quantity of the slit light detector 12 scanned by the rectilinear movement mechanism 9 is detected from a reference position. While, in FIG. 3, only a feed screw and nut are depicted as the rectilinear movement mechanism 9, a slide mechanism is included actually.

Numeral 40 designates a motor control circuit for driving the motor 10 at a constant speed. Numeral 41 designates a light section waveform extracting circuit to which a two-dimensional image signal obtained from an image detector 3 is inputted and which extracts a light section waveform in a way described in U.S. Pat. No. 4,343,553. An image processor 42 detects the position and inclination of an object which is closest to the robot and which is desired to be handled by the robot. Shown at numeral 43 is a robot control device for controlling the robot 15.

Figure 10:
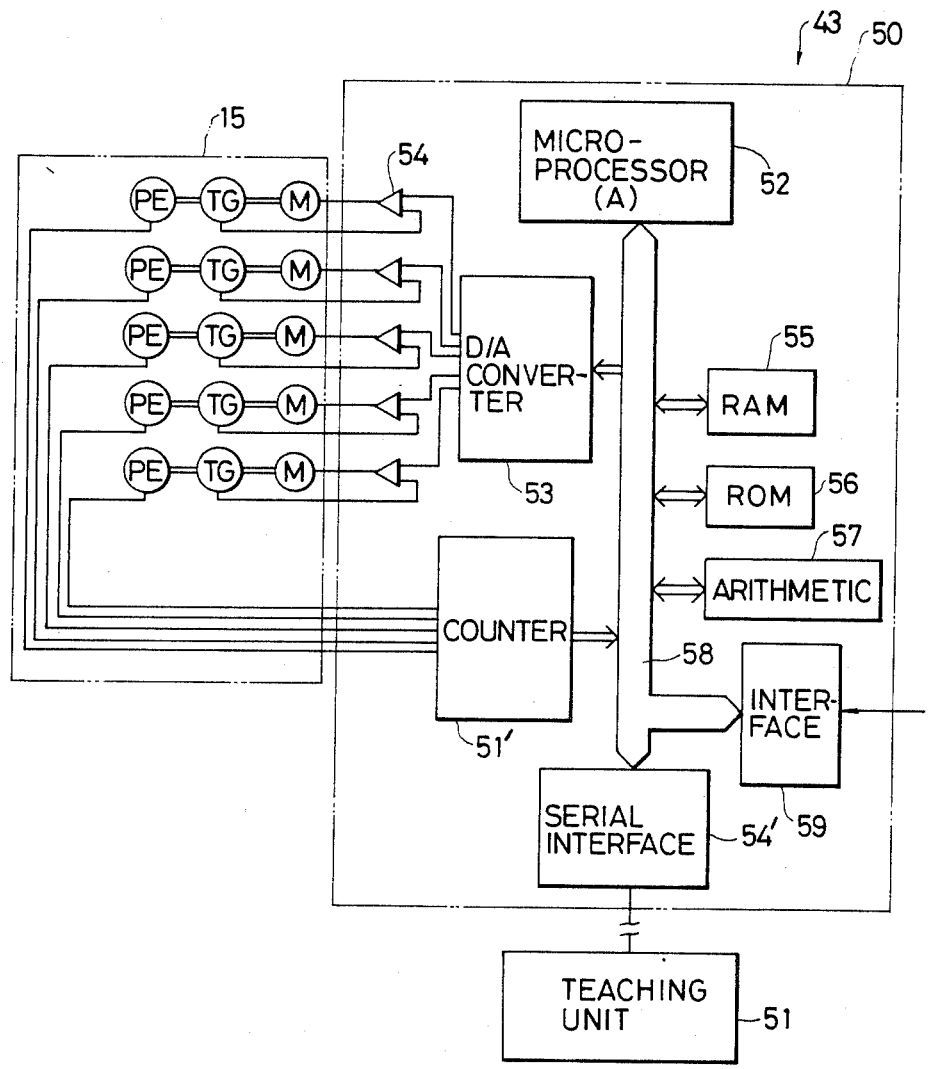
FIG. 10 is a diagram showing the schematic arrangement of a robot control device.

Referring now to FIG. 10, description will be made on the robot control device 43. The robot control device 43 is constructed of a control unit 50 which controls the articulated robot 15 having five types of freedom, and a teaching unit 51 which teaches information on a previously programmed path and speeds for causing the robot 15 to be operated or moved along the predetermined path at the programmed speeds on point-to-point basis. The control unit 50 and the robot mechanism 15 constitute a position control system in which output values produced by pulse encoders PE coupled to respective actuators M are fed back to the control unit 50 through a counter 51', whereby differences between the target or desired coordinate values determined previously by a microprocessor (A) 52 and the corresponding transformed values of the encoder outputs are converted into analog values by means of a digital-to-analog (D/A) converter 53 for driving the actuators M. Each drive circuit 54 drives the corresponding actuator M on the basis of a speed signal from a tachometer generator TG connected to this actuator M and an analog signal from the D/A converter 53. A serial interface 54' serves to connect the control unit 50 with the teaching unit 51. A ROM 56 is a memory which stores a program for operating the robot 15. A RAM 55 stores the operating path of the robot's hand on the basis of a teaching operation executed by the teaching unit 51 and an interpolation operation executed by an arithmetic 57. Shown at numeral 58 is a bus line. The positional data of the robot's hand stored in the ROM 56 are read out by the microprocessor 52 and undergo coordinate transformation into contrapositive displacements $\theta_1, \theta_2, \ldots$ and $\theta_5$, which are outputted through the transformed output port at 53 and utilized for driving the robot's hand to the desired or target position (for example, predetermined position for visually recognizing the object). The interface 59 of the control unit 50 serves to connect the image processor 42 to the robot control device 43.

Figure 3:
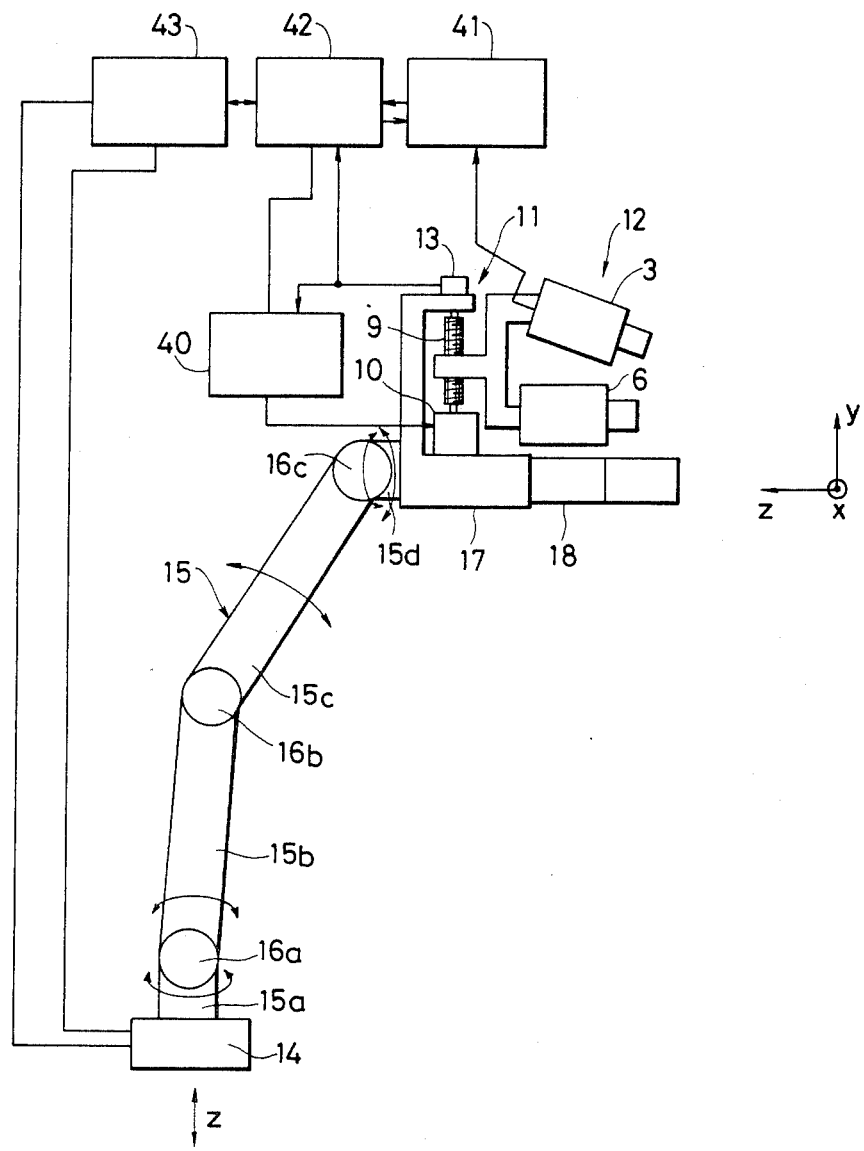
FIG. 3 is a view for explaining the arrangement of an embodiment of the present invention.
Figure 4:
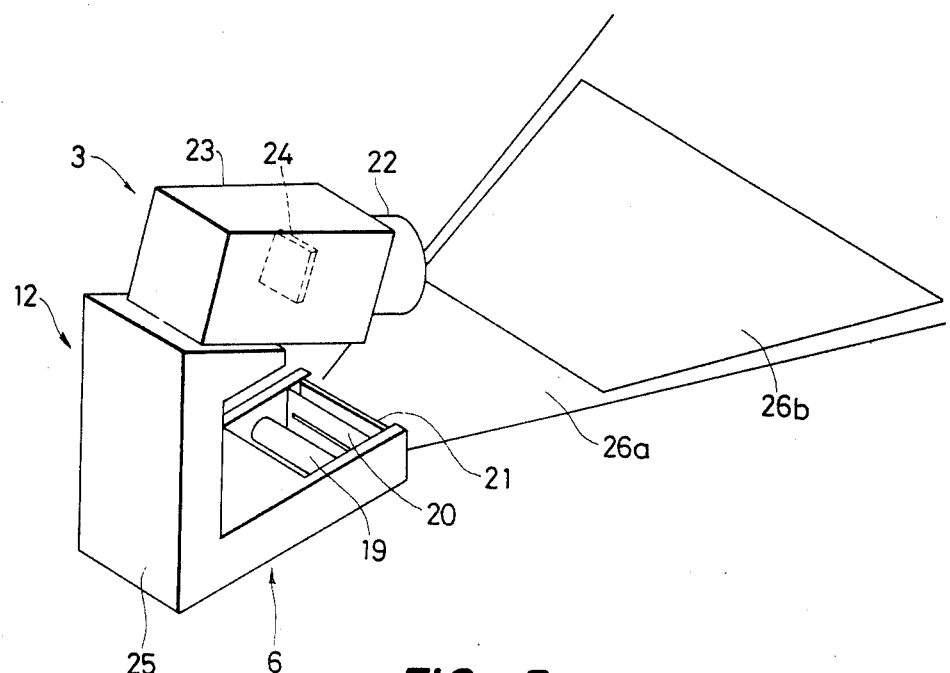
FIG. 4 is a view for explaining the arrangement of a slit light detector in the embodiment of the present invention.

FIG. 4 shows the slit light detector 12 in the embodiment of FIG. 3 more in detail. The slit light projector 6 is constructed of a lamp 19 having a straight filament, a slit 20 and a cylindrical lens 21. The image detector 3 is constructed of an imaging lens 22 and a TV camera 23. Numeral 24 in the figure denotes the chip of a two-dimensional array sensor within the solid-state TV camera.

Figure 5:
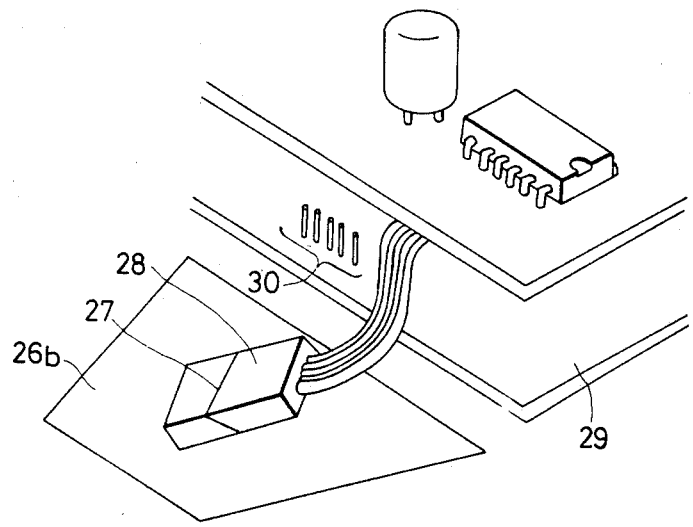
FIG. 5 is a view for explaining an object to-be-handled in the embodiment.
Figure 6:
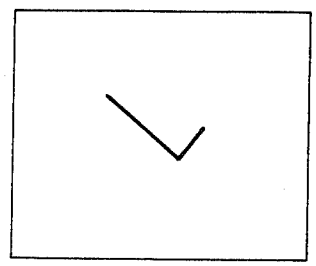
FIG. 6 shows an example of slit light segmentation.
Figure 7A:
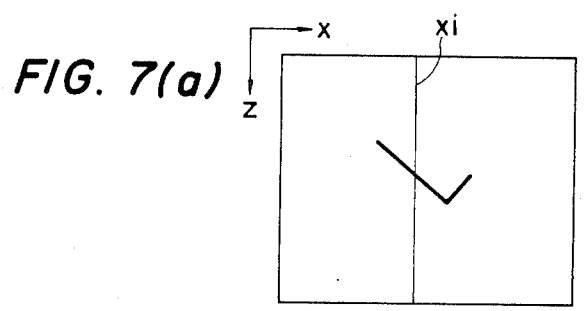
FIGS. 7(a), 7(b), 7(c) show diagrams for explaining slit light segment extracting processing.
Figure 7B:
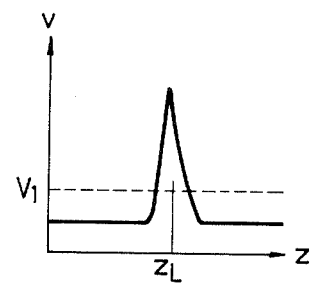
Figure 7C:
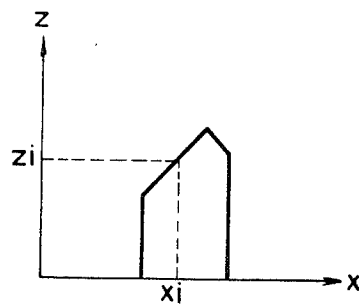

With the slit light projector 6, rectilinear light in light emitted by the lamp 19 which has passed through the slit 20 is turned by the cylindrical lens 21 into a collimated beam, which illuminates the front area of the robot arm. Symbol 26a in FIG. 4 indicates the plane of the illuminating slit light. The image detector 3 is inclined and fixed by a holding portion 25 so that its optic axis may intersect the slit light plane 26a obliquely (at an angle $\alpha$). A trapezoidal plane at symbol 26b in FIG. 4 indicates the field of view that is detected by the image detector 3 within the slit light plane 26a. As exemplified in FIG. 5, when an object exists within this field of view, a bright line 27 develops on the surface of the object, and the image of the bright line is detected by the image detector. As an example of a robot job, FIG. 5 illustrates the circumstances of the operations of detecting the position and posture of a connector component 28 with wires, gripping the component and insertingly connecting it with pins 30 on a substrate 29. FIG. 6 shows a detection picture by the image detector 3 shown in FIG. 4, and a slit bright-line, i.e. light-section image is detected as being bright. As apparent from the geometrical relationship between the slit light projector 6 and the image detector 3 in FIG. 4, the relation of distance on the plane of this picture is such that an upper part in the picture is far, whereas a lower part is near. The light-section waveform extracting circuit 41 extracts a light-section waveform with the slit bright-line image of FIG. 6 being distant from the picture plane to the slit bright line. FIG. 7 illustrates an example of the extracting processing (the details of which are disclosed in U.S. Pat. No. 4,343,553). (a) of FIG. 7 shows an input picture which is applied from the image detector 3 to the light-section waveform extracting circuit 41. Now, the image signal of one vertical scanning line $x_i$ obtained from the image detector 3 is as shown in (b) of FIG. 7 by way of example. The image signal is compared with a threshold value $V_1$, and the central position $Z_L$ of the intersection points of $V_1$ is found. When such central positions $Z_L$ for respective scanning lines $x_i$ are found and outputted, a light segment (waveform data) can be obtained as shown in (c) of FIG. 7. The light-section waveform extraction may be based on peak position detection, instead of finding the center by the threshold value processing mentioned here. In addition, while the origin of the z-axial coordinate is taken in a far part in this example, it may well be taken in a near part. The coordinate transformation of the z-axial direction can also be readily performed in perspective. Besides, while the processing can be executed at high speed by electric circuitry, it may entirely be software processing.

Figure 8:
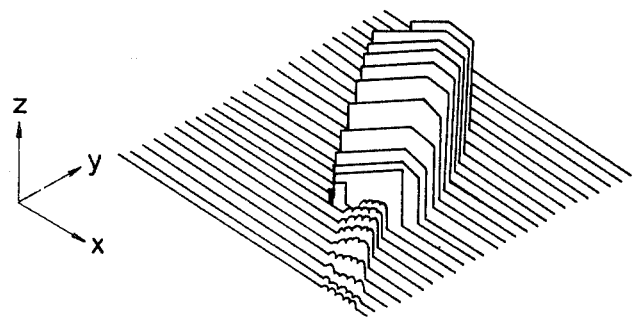
FIG. 8 is a diagram showing examples of range data.
Figure 9:
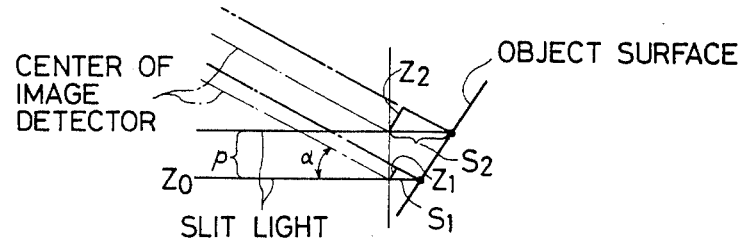
FIG. 9 is a diagram showing the relationship among slit light, the center of an image detector and an object surface.

When the above processing is carried out while the slit-light detector is being moved by means of the motor 10, range data can be obtained. FIG. 8 shows examples of the range data or a distance picture. In the figure, they are illustrated with many lines of light-section waveforms. When they are seen as xy-plane pictures, the brightness z corresponds to the distance s from the slit-light detector 3. Brighter is a closer picture. (In FIG. 9, $z_2 = s_2 \sin \alpha$ and $z_1 = s_1 \sin \alpha$.)

Figure 11:
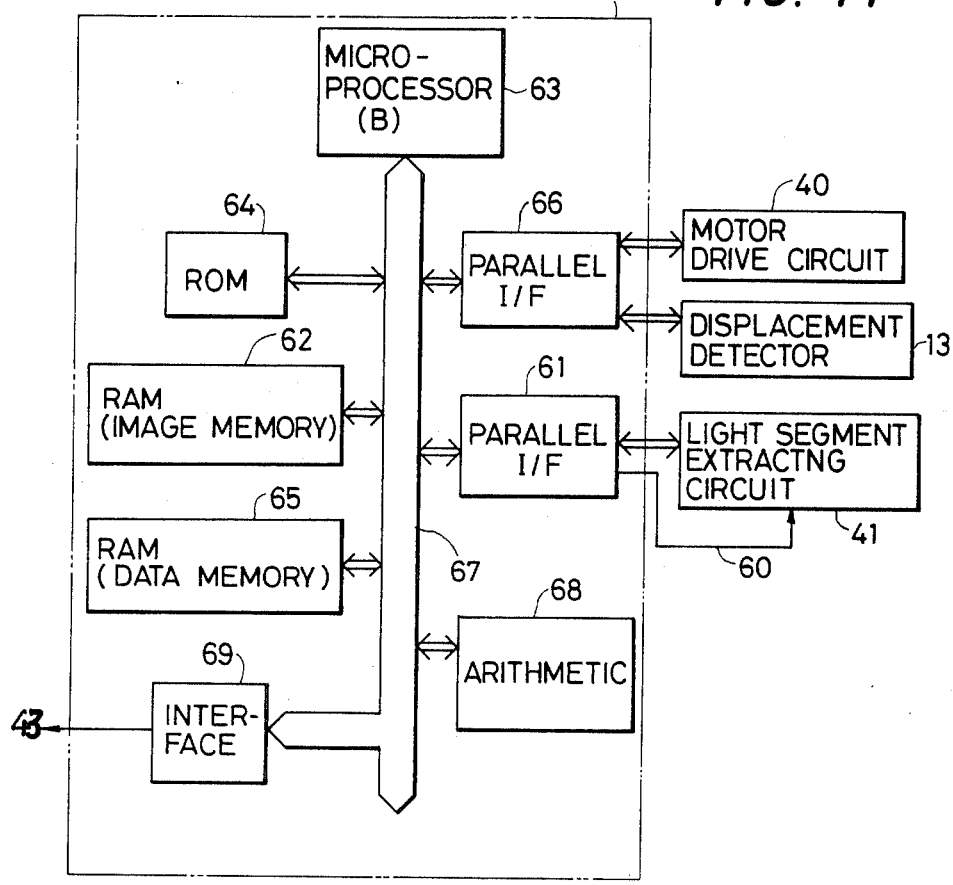
FIG. 11 is a diagram showing the schematic arrangement of an image processor.
Figure 12:
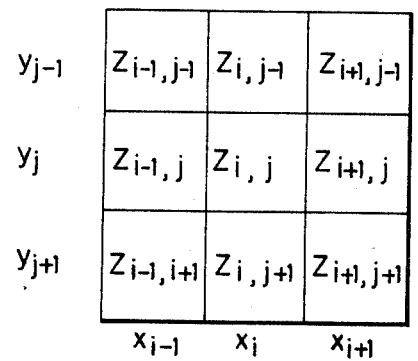
FIG. 12 is a diagram showing the state in which distances on 3×3 picture elements have been cut out in order to detect a jump edge by differentiating a range data signal.

The movement of the head, namely, the feed thereof in the y-axial direction is executed by a constant-speed motor, and the light segment extracting circuit 41 samples the light segments at fixed time intervals by the use of a sampling signal 60 (FIG. 11) obtained from the image processor 42. As an alternative measure, while the head is being fed by the pulse motor 10, the light segment is sampled every fixed pulse interval (each time the head is moved a fixed distance p in the z-direction). As another alternative measure, owing to the combination of the D.C. motor 10 and the encoder 13, the light segment is sampled each time the head is moved a fixed amount. As regards the number of light segments to be detected, at least two segments may be selected according to the job object of the robot's vision. The same applies to pitches. These are controlled by the image processor 42. The processing contents of the distance picture inputted to the image processor 42 may also be selected according to the job object of the robot's vision. Here, the job object of FIG. 5 will be explained as an embodiment. The distance pictures obtained are those shown in FIG. 8. As shown in FIG. 11, the distance pictures (the values $z_i$ of distances corresponding to $x_i$ for the respective light segments) are obtained from the light-section waveform extracting circuit 41, and they are stored through a parallel interface 61 into a RAM 62 as an image memory. The microprocessor (B) 63 of the image processor 42 reads out distances (regarding 3×3 picture elements)

$$z_{i-1,j-1},\ z_{i+1,j-1},\ z_{i-1,j+1}\ \text{and}\ z_{i+1,j+1}$$

on $x_{i-1}$ and $x_{i+1}$ for the adjacent light segments $y_{j-1}$ and $y_{j+1}$ as shown by way of example in FIG. 12, and then performs the following differentiation:

$$z'_{i,j} = \frac{|z_{i-1,j-1} - z_{i+1,j+1}| + |z_{i+1,j-1} - z_{i-1,j+1}|}{2}$$

Figure 13:
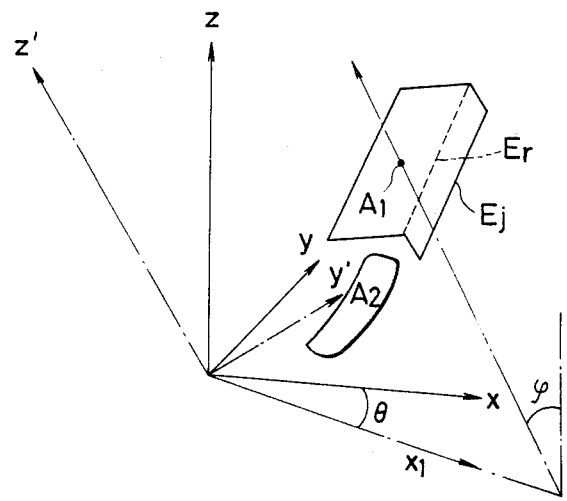
FIG. 13 is a diagram showing a jump edge and a roof edge in a distance picture.

When this value is larger than a certain reference value, the presence of a jump edge (the boundary between the object and the background) is meant. The aforementioned value $z'_{i,j}$ is stored in another area of the RAM 62. Further, the microprocessor 63 segments closed regions which are surrounded with solid lines (jump edges) $E_j$ as shown in FIG. 13. Then, it evaluates the areas and the heights of the centers of gravity of the respective closed regions $A_1$ and $A_2$. Thus, it separates and extracts the desired object which falls within an appointed range and which has the highest center of gravity.

Moreover, a plane region which is surrounded with the jump edge $E_j$ and a roof edge $E_r$ indicated by a dotted line in FIG. 13 by way of example is extracted. The separated and extracted plane region is approximated into a plane, the normal direction of which is recognized as the three-dimensional posture of the component.

More specifically, the region of the major plane surrounded with the jump edge and the roof edge is approximated into a plane by the method of least squares. The equation of the plane to be obtained is expressed by $$t_1 x + t_2 y + t_3 = z \tag{1}$$

and the x-, y- and z-coordinates of m points within the major plane extracted from the distance picture are expressed by $(a_{i1}, a_{i2}, b_i)_i = 1, 2, \ldots$ and m. Then, $t_1$, $t_2$ and $t_3$ in Equation (1) is calculated to be:

$$= (A^T A)^{-1} A^T b \tag{2}$$

as a matrix in which $(t_j)_j = 1, 2$ and 3 form rows. Here, A denotes a matrix whose rows are $(a_{i1}, a_{i2}, 1.0)$, b a matrix whose rows are $(b_i)$, T a transposed matrix, and $^{-1}$ an inverse matrix.

The position of the center of gravity of the major plane region has already been found at the segmentation step. The normal direction of the major plane is denoted by an angle $\phi$ defined between the z-axis and a normal to the plane, and an angle $\theta$ defined between the x-axis and the projection of the normal on the xy-plane.

Using (Equation (1)) obtained at the planar approximation, $\phi$ and $\theta$ are expressed as:

$$\phi = \cos^{-1} \frac{1}{\sqrt{t_1^2 + t_2^2 + 1}} \tag{3}$$

$$\theta = \tan^{-1} \frac{t_2}{t_1} \tag{4}$$

Further, when the parameters of the major surface are rotated according to the values of these angles $\phi$ and $\theta$ so as to transform the coordinates into x', y' and z' as illustrated in FIG. 13, the shape of the major plane viewed in the normal direction can be recognized.

In this way, the microprocessor (B) 63 can evaluate the position and spacial inclination of the major plane of the object aimed at, with reference to the robot's hand. Whether or not the plane is the surface of the connector, can be examined from the size and shape of the plane as described before. In addition, by sensing the direction in which the wire $A_2$ exists nearby, it can be decided that the opposite side is in the direction in which the pins are to be inserted. The remaining two sides are planes which the robot's fingers are to grip. In FIG. 11, a ROM 64 constituting the image processor 42 stores therein programs for the jump edge detection, the segmentation, the separate extraction of the component aimed at, the extraction of the plane region of the component based on the roof edge detection, the recognition of the three-dimensional posture of the component based on the normal direction of the plane, the recognition of the component, etc. A RAM 65 functions to temporarily store data calculated by an arithmetic 68. Shown at numeral 67 is a bus line.

Data on the position, posture and direction of the major surface of the object are sent from the interface 69 of the image processor 42 to the robot control device 43. Since the grip points, the position to be approached and the direction thereof for the robot's fingers 18 have been determined, the microprocessor 52 of the robot control device 43 adds them to the data of the robot arm control stored in the RAM 55, so as to transform them into the data of the control coordinate system of the robot. These data are transmitted through the D/A converter 53 to the drive circuits 54. The actuators M with which the robot 15 is furnished are driven, so that the fingers of the robot 15 grip the connector 28 on the basis of the aforementioned information and insertingly fit it on the pins 30 existing in a position given by a teaching operation beforehand.

The above is the operating example of one embodiment of the present invention.

As described above, the slit-light projection and detection head and the head movement mechanism are mounted on the robot arm, and the distance pictures obtained are subjected to the recognition processing, whereby the three-dimensional position and posture of the object having been undetectable with the prior arts can be detected and fed back to the robot arm. While, in the embodiment of the present invention, the steady slit light has been used for the slit-light projection, it may be replaced with stroboscopic slit-light. In addition, while the slit light has been used in the embodiment of the present invention, it may be replaced with a bright and dark straight edge which is bright on one side and dark on the other side. Besides, the projection of the slit light may be replaced with a system in which spot light is scanned on the light segment plane 26a.

In order to obtain the distance picture from the slit-light projection and detection head 12 mounted on the hand 17 of the robot 15, this head is rectilinearly scanned by the detection head scanning mechanism 9 installed on the hand 17 as in the embodiment shown in FIG. 3. In this regard, it is to be understood that an alternative measure may be taken in which, while the robot's hand 17 is being moved in the y-axial direction at a uniform speed by means of the robot control device 43, the coordinate values thereof are sent to the image processor 42 and are simultaneously sampled at fixed intervals p. However, such embodiment in which the head is scanned by moving the robot's hand 17 is inferior in responsiveness to the embodiment of FIG. 3.

Figure 14:
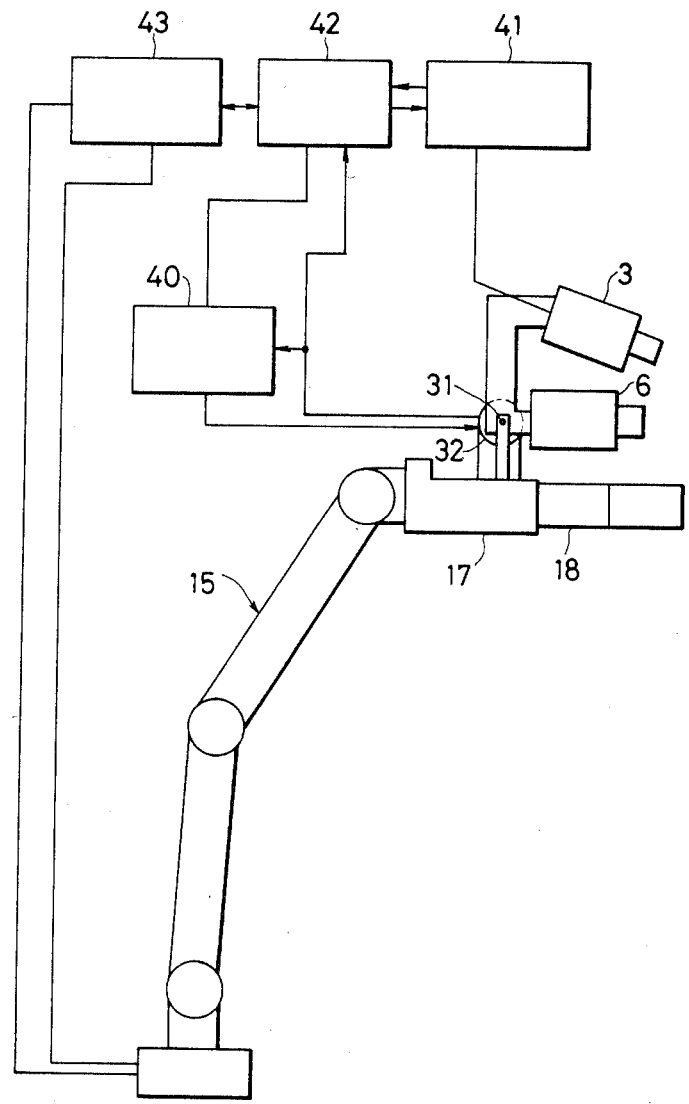
FIG. 14 is a view showing an embodiment of the present invention different from that of FIG. 3.
Figure 15:
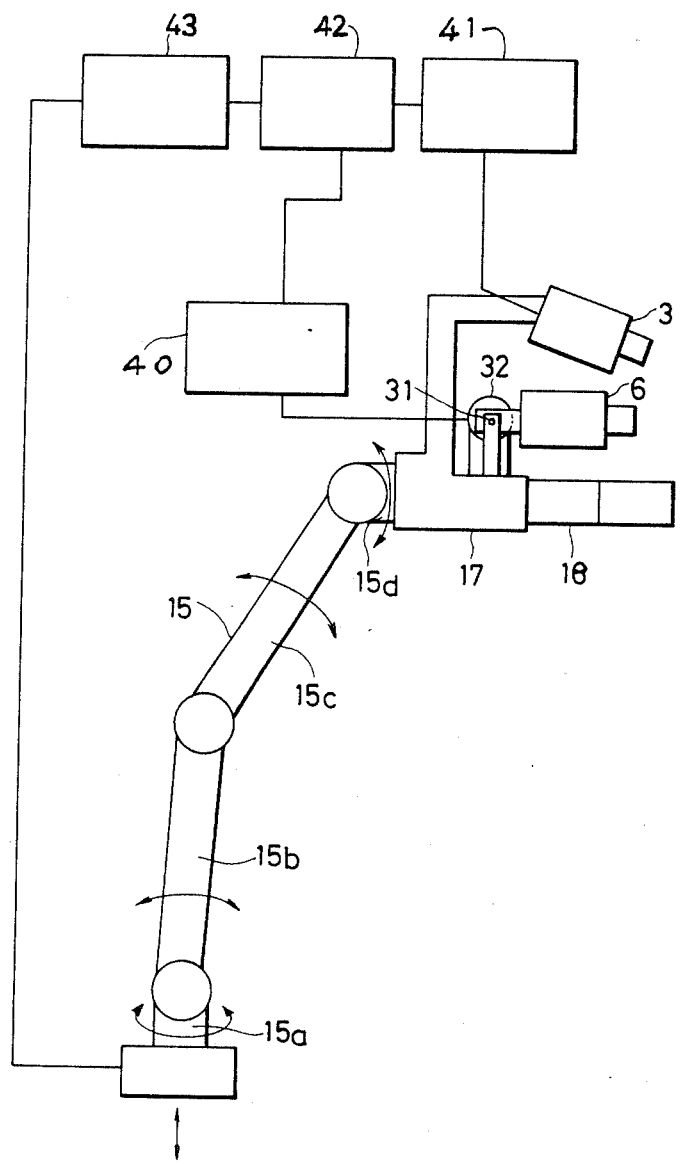
FIG. 15 is a view showing still another embodiment of the present invention.

In order to obtain the distance picture from the slit-light projection and detection head, the detection head scanning mechanism is indispensable. Besides the rectilinear movement mechanism shown in the embodiment of FIG. 3, the mechanism may be a mechanism wherein the image detector 3 and the slit light projector 6 are swiveled about a rotary pin 31 perpendicular to the sheet of the drawing by means of a rotating motor 32 as exemplified in FIG. 14, or a mechanism wherein only the slit light projector 6 is swiveled as exemplified in FIG. 15.

In this case, the distance pictures are not proportional to the respective rotational angles, but they fall into a complicated expression of relationship including a trigonometric function. Therefore, it becomes very complicated to find the inclination, direction and position of a certain plane of the desired object. However, when the inclination, direction and position of the certain plane of the object need not be exactly evaluated, the expression of the relationship can be substituted by an approximation expression, and hence, the scanning mechanism may be the swivel mechanism. As the scanning mechanism to be installed on the hand 17, the swivel mechanism can be made mechanically simpler than the rectilinear scanning mechanism.

Furthermore, while the embodiment of the present invention has exemplified the case of attaching the light segmentation and detection head to the position having the same degrees of freedom as those of the fingers, namely, to the hand, essentially the degrees of freedom of the arm are optional, and what part of the arm the detection head is to be mounted on ought to be decided depending upon the job object. Since, however, the posture and shape of the object to be handled assume various aspects, they need to be visually detected in the directions of at least three degrees of freedom. It is therefore recommended to mount the light segmentation and detection head on the fore end of that member of the robot which is moved with at least three degrees of freedom.

By way of example, in a case where the robot 15 is of the articulated type, it comprises the turret 15a which turns about the vertical axis z, the upper arm 15b which is supported on the turret 15a so as to be turnable in the direction of an arrow, the forearm 15c which is supported on the turning end of the upper arm 15b so as to be turnable in the direction of the arrow, and the wrist 15d which is supported on the turning end of the forearm 15c so as to be turnable in the direction of an arrow and to which the hand 17 provided with the fingers 18 is attached. Since the slit-light detection head having the scanning device ought to be mounted on the fore end of any member which operates with at least three degrees of freedom, desirably it is attached to the forearm 15c, the wrist 15d or the hand 17. In addition, the attachment of the light segmentation head to the hand 17 is favorable in order to facilitate the transformation of the posture and position information of the object detected by the light segmentation head, into the coordinates of the robot system. However, although the foregoing embodiment has been explained as to the articulated type robot, it is to be understood that the invention is also applicable to a cartesian type robot and a cylindrical type robot.

While the embodiment has exemplified the operation of picking up the connector, it is to be understood that the job object is not restricted thereto but that it may be any of assembly operations, transportation operations, positioning operations, plate working operations including welding, and inspection, adjustment and selection operations.

As set forth above, according to the present invention, a slit-light detector which has a slit light projector and a two-dimensional image detector is disposed near the fore end part of a robot, and the distance picture of an object to-be-handled as viewed from the robot is detected by actuating a scanning device or the robot itself, whereby the three-dimensional shape of the object can be detected. This brings forth the effect that the state of the object in a three-dimensional space can be detected accurately and at high speed so as to cause the robot to perform a predetermined operation on the basis of the detected result. Especially, the present invention installs a three-dimensional shape detector on the robot and can change the three-dimensional shape detector into various positions and postures. This brings forth the effect that the three-dimensional shapes of objects having various postures and shapes can be accurately detected by conforming the detector to the objects.

We claim:

1. A robot system for operating upon an object, comprising:
   a robot having an operating member movable with at least three degrees of freedom;
   robot control means for moving the operating member of the robot according to a program;
   a three-dimensional shape detection device mounted on the operating member of the robot, said three-dimensional shape detection device comprising a light projector which projects light so as to form a slit-light on the object, an image detector which projects in two dimensions an image of the light-segment projected by said light projector, and a scanning device which scans at least the slit-light in a predetermined direction;

circuit means for extracting a range data signal representing the image of the light-segments from the image signal detected by the image detector in accordance with scanning performed by said scanning device;

an image processor for visually recognizing the three-dimensional shape of the object including the position and the inclination, said image processor comprising differentiation means for differentiating the range data signal obtained by said circuit means to form a jump edge image signal representing a jump edge of the object, separation means for separating the range data into a region closed with the jump edge, extraction means for extracting a necessary region from the separated region and then extracting the range data of a major plane from the extracted region, and detection means for detecting a position of a center of gravity and an inclination of the major plane on the basis of the range data; and means for modifying said program to thereby modify the movement of said operating member of the robot in response to said recognized three-dimensional shape of the object obtained by said image processor so as to be able to operate the object with said operating member of the robot.

2. A robot system according to claim 1, wherein said scanning device of said three-dimensional shape detection device is so constructed as to scan the slit-light in parallel.

3. A robot system according to claim 2, wherein said scanning device is so constructed as to integrate said light projector and said image detector therewith and to scan the slit-light image detector therewith and to scan the slit-light rectilinearly.

4. A robot system according to claim 3, wherein said robot operates with at least three degrees of freedom, and said three-dimensional shape detection device is mounted on a fore end of the member to operate with at least three degrees of freedom.

5. A robot system according to claim 4, wherein said means for moving moves said at least one of said detector means and said projector means relative to said portion of said arm on which it is mounted during the object scan.

6. A robot system according to claim 4, wherein said circuit means further provides said three-dimensional representation of the object in the coordinate system of the program employed by said control means, and said means for modifying modifies the angular position of the outer end of said manipulator arm in accordance with the determined slope of the outer edges of the object.

7. A robot system according to claim 4, wherein said circuit means further determines roof edges between the outer edges as plots of abrupt intensity changes of said plurality of image signals in the area between said outer edges.

8. A robot system according to claim 7, wherein said means for moving moves said at least one of said detector means and said projector means relative to said portion of said arm on which it is mounted during the object scan.

9. A robot system according to claim 2, wherein said robot operates with at least three degrees of freedom, and said three-dimensional shape detection device is mounted on a fore end of the member to operate with at least three degrees of freedom.

10. A robot system, according to claim 9, wherein said image signal has an intensity corresponding to the intensity of the reflected beam from the line intersection between the plane of said projected beam and the object;

said circuit means scans said line image signal along its length and produces a dimensional representation of the line on said object by determining a jump edge position on the line corresponding to the change from background reflected radiation to object reflected radiation;

said means for moving provides a scan wherein said line of intersection is moved perpendicular to itself to produce a plurality of line images;

said circuit means determines outer edges of said object from the plot of said jump edge representations, and determines the slope of said outer edges in accordance with the change in detected intensity of the jump edge representations along the outer edges.

11. A robot system according to claim 9, wherein said means for moving moves said at least one of said detector means and said projector means relative to said portion of said arm on which it is mounted during the object scan.

12. A robot system according to claim 9, wherein said circuit means provides said three-dimensional representation in the same coordinate system as said program; and said means for modifying said program changes the angular relationship of said outer end of said manipulator arm in accordance with the posture of the object and further changes the program in accordance with the position of the object.

13. A robot system according to claim 1, wherein said robot operates with at least three degrees of freedom, and said three-dimensional shape detection device is mounted on a fore end of the operating member to operate with at least three degrees of freedom.

14. A robot system according to claim 1, wherein said robot control means is operatively responsive to information generated by said image processor, and wherein said image processor recognizes the three-dimensional shape including the position and inclination of the object, and that information of the position and inclination of the object obtained from said image processor is fed back to said robot control means and is used in said program, so that said robot can handle the object.

15. A robot system for operation upon an object, comprising:

a robot having an operating member movable with at least three degrees of freedom;

robot control means for moving the operating member of the robot according to a program;

a three-dimension shape detection device mounted on the operating member of the robot, said three-dimension shape detection device comprising a light projector which projects light so as to form a slit-light on the object, an image detector which projects in two dimensions an image of the light-segment projected by said light projector, and means for scanning the slit-light by moving the operating member of said robot in a predetermined direction whereby the slit-light is detected by said image detector as range data, so that a three-dimensional shape of the object can be visually recognized;

circuit means for extracting a range data signal representing the image of the light-segments from the image signal detected by the image detector in accordance with scanning performed by said scanning device;

an image processor for visually recognizing the three-dimensional shape of the object including the position and the inclination, said image processor comprising differentiation means for differentiating the range data signal obtained by said signal means to form a jump edge image signal representing a jump edge of the object, separation means for separating the range data into a region closed with the jump edge, extraction means for extracting a necessary region from the separated region and then extracting the range data of a major plane from the extracted region, and detection means for detecting a position of a center of gravity and an inclination of the major plane on the basis of the range data; and means for modifying said program to thereby modify the movement of said operating member of the robot in response to said recognized three-dimensional shape of the object obtained by said image processor so as to be able to operate the object with said operating member of the robot.

16. A robot system according to claim 15, wherein said robot is constructed with at least three degrees of freedom, and that said shape detection device is mounted on the member to operate with at least three degrees of freedom.

17. A robot system according to claim 15, wherein said robot control means is operatively responsive to information generated by said image processor, and wherein said image processor visually recognizes a position and an inclination of the object, and the information of the position and inclination of the object obtained from said image processor is fed back to said robot control means and is used in said program, so that said robot can handle the object.

18. A robot system for operating upon a object comprising:

a base;

a manipulatable arm having means as its outer end for providing a desired function and to move along a desired path, means mounting the other end of said arm to said base, and means providing at least three degrees of freedom for the outer end of said arm relative to said base;

control means for moving said arm according to a program;

three-dimensional shape detector means mounted near the fore part of said arm on a portion of said arm that has at least three degrees of freedom relative to said base for movement of said detector means with said portion in accordance with the program, said shape detector means including projector means for projecting a beam of radiant energy to form a slit-light pattern on an object whose shape is to be detected, image detector means for receiving the radiant energy reflected from said object to produce in two dimensions a corresponding image signal of the light segment projected by said projector means, and means for moving at least one of said detector means and said projector means relative to the object to scan said object and produce a plurality of different image signals of the object;

circuit means for extracting a range data signal representing the image of the light-segments from the image signal detected by the image detector in accordance with scanning performed by said scanning device;

an image processor for visually recognizing the three-dimensional shape of the object, comprising differentiation means for differentiating the range data signal obtained by said circuit means to form a jump edge image signal representing a jump edge of the object, separation means for separating the range data into a region closed with the jump edge, extraction means for extracting a necessary region from the separated region and then extracting the range data of a major plane from the extracted region, and detection means for detecting a position of a center of gravity and an inclination of the major plane on the basis of the range data; and means for modifying said program to thereby modify the movement of said robot arm in response to said detected three-dimensional shape of the object.

* * * * *